(12) United States Patent
De Kok et al.

(10) Patent No.: US 8,351,298 B2
(45) Date of Patent: *Jan. 8, 2013

(54) ROTATIONAL MOTION COMPENSATED SEISMIC SENSORS AND METHODS OF USE IN SEISMIC DATA ACQUISITION

(75) Inventors: Robbert J. De Kok, Nijlande (NL); Nicolas Goujon, Oslo (NO); Leendert Combee, Oslo (NO); Aslaug H. S. Melbø, Oslo (NO)

(73) Assignee: WesternGeco L.L.C., Houston, TX (US)

( * ) Notice: Subject to any disclaimer, the term of this patent is extended or adjusted under 35 U.S.C. 154(b) by 120 days.

This patent is subject to a terminal disclaimer.

(21) Appl. No.: 12/604,053

(22) Filed: Oct. 22, 2009

(65) Prior Publication Data

US 2010/0103770 A1    Apr. 29, 2010

Related U.S. Application Data

(63) Continuation of application No. 11/394,722, filed on Mar. 31, 2006, now Pat. No. 7,656,746.

(60) Provisional application No. 60/669,564, filed on Apr. 8, 2005.

(51) Int. Cl.
*G01V 1/18* (2006.01)

(52) U.S. Cl. .......................................... 367/178; 73/649

(58) Field of Classification Search ............... 367/15, 367/20, 178, 188; 73/649
See application file for complete search history.

(56) References Cited

U.S. PATENT DOCUMENTS

| | | | |
|---|---|---|---|
| 4,345,473 A | 8/1982 | Berni | |
| 4,520,467 A | 5/1985 | Berni | |
| 4,732,261 A | 3/1988 | Mattern et al. | |
| 4,791,617 A * | 12/1988 | Seymour | 367/171 |
| 4,932,261 A | 6/1990 | Henrion | |
| 5,189,642 A * | 2/1993 | Donoho et al. | 367/15 |
| 5,257,062 A | 10/1993 | Moriyama | |
| 5,307,325 A * | 4/1994 | Scheiber | 367/178 |
| 5,818,353 A | 10/1998 | Eaton, Jr. et al. | |
| 5,831,164 A | 11/1998 | Reddi et al. | |
| 5,996,409 A * | 12/1999 | Funk et al. | 73/504.04 |
| 6,021,091 A | 2/2000 | Gaiser | |
| 6,021,191 A * | 2/2000 | Ash et al. | 379/221.05 |
| 6,205,403 B1 | 3/2001 | Gaiser et al. | |

(Continued)

FOREIGN PATENT DOCUMENTS

EP    0461761    12/1991

(Continued)

OTHER PUBLICATIONS

Search Report of British Application Serial No. 0606905.8 dated Aug. 2, 2006.

(Continued)

*Primary Examiner* — Ian Lobo

(57) ABSTRACT

Apparatus and methods for acquiring seismic data using a seabed seismic data cable positioned on a seabed are described, including correcting for the effect of one or more sensor non-linear motions, which improves accuracy of seismic data. One or multiple non-linear movements of the sensor may be corrected for. It is emphasized that this abstract is provided to comply with the rules requiring an abstract, which will allow a searcher or other reader to quickly ascertain the subject matter of the technical disclosure. It is submitted with the understanding that it will not be used to interpret or limit the scope or meaning of the claims. 37 CFR 1.72(b).

9 Claims, 3 Drawing Sheets

U.S. PATENT DOCUMENTS

| | | | |
|---|---|---|---|
| 6,430,105 B1 * | 8/2002 | Stephen .................. 367/15 |
| 6,992,951 B2 | 1/2006 | O'Brien et al. |
| 7,021,146 B2 | 4/2006 | Nash et al. |
| 7,254,093 B2 * | 8/2007 | Ray et al. .................. 367/188 |
| 7,260,024 B2 | 8/2007 | Goujon et al. |
| 7,656,746 B2 * | 2/2010 | De Kok et al. .................. 367/19 |
| 2005/0018537 A1 | 1/2005 | Welker et al. |
| 2005/0195686 A1 | 9/2005 | Vaage et al. |
| 2005/0257616 A1 | 11/2005 | Kozlov et al. |

FOREIGN PATENT DOCUMENTS

| | | |
|---|---|---|
| GB | 829821 | 3/1960 |
| GB | 2384313 A | 7/2003 |
| GB | 2388906 A | 11/2003 |

OTHER PUBLICATIONS

Examination Report of British Application Serial No. 0606905.8 dated Apr. 14, 2008.

F. Pasolini, "LIS1R02 (L6671): A Digital Output Angular Accelerometer," www.st.com, Application Note AN1515, Feb. 2002: pp. 1-12, <http://www.st.com/internet/com/TECHNICAL_RESOURCES/TECHNICAL_LITERATURE/APPLICATION_NOTE/CD00004328.pdf>.

Caldwell et al., "Shear Waves Shine Brightly," Oilfield Review, 1999: pp. 2-15.

* cited by examiner

ROTATIONAL MOTION COMPENSATED SEISMIC SENSORS AND METHODS OF USE IN SEISMIC DATA ACQUISITION

CROSS-REFERENCE TO RELATED APPLICATIONS

This application is a continuation of U.S. patent application Ser. No. 11/394,722, filed Mar. 31, 2006 now U.S. Pat. No. 7,656,746, which claims the benefit of and priority to U.S. Provisional Patent Application Ser. No. 60/669,564, filed Apr. 8, 2005. Each of the aforementioned related patent applications is herein incorporated by reference.

BACKGROUND OF THE INVENTION

1. Field of Invention

The present invention relates generally to the field of seismic data acquisition, and particularly to sensors and cables adapted to lie on a seabed and methods of using same to acquire seabed seismic data.

2. Related Art

Marine seismic exploration investigates and maps the structure and character of subsurface geological formations underlying a body of water. In so-called seabed seismic, a cable containing seismic receivers is deployed onto the seabed from a surface vessel. In theory, it is now possible to use so-called multi-component data acquisition, where multi-component refers to compressional wave and shear wave component seismic surveying. However, in practice, results may be sub-optimal due to inadequate coupling of the sensors to the seabed, and rotation of sensor housings along one or more axis.

It is evident that there is a need in the art for improvement in seabed seismic data acquisition.

SUMMARY OF THE INVENTION

In accordance with the present invention, seabed seismic sensors, cables including same, and methods of using same in seabed seismic data acquisition are described which compensate for rotational, rolling and/or pivoting motion of the sensor unit, whether due to currents, or the seismic waves themselves, or both. The rotational, rolling, and/or pivoting motion may be referred to herein as non-linear motion.

A first aspect of the invention is an apparatus comprising a seabed seismic sensor, the sensor comprising at least one linear motion seismic sensing unit, and means for sensing one or more non-linear motions of the seabed seismic sensor. The non-linear motion may be rotation, rolling, or pivoting, and may be about any axis of symmetry, or any axis substantially parallel to an axis of symmetry of the seabed seismic sensor.

Apparatus in accordance with the invention may include a plurality of linear motion seismic sensor units, which may be positioned inside the cable body, or may be placed in sensor housings, the housings fastened to the cable. As used herein the phrase "seabed seismic sensor" includes any housing used. In either case the linear motion seismic sensor units may be spaced along the cable in any fashion. Seabed seismic sensors are often of a shape that attempts to minimize or prevent rotational, rolling and pivoting of the seabed seismic sensor for example. This is not always perfectly achieved. The seabed seismic sensors and methods of the invention compensate for distorted signals associated with one or more non-linear motions of the seabed seismic sensor which are recorded by the linear motion seismic sensing units if the rotation, pivoting, or rolling is about a line parallel with the longitudinal axis of symmetry of the seabed cable. In some embodiments, when distorted signals associated with non-linear motion about an axis substantially parallel to the longitudinal axis of symmetry of the seabed cable are to be corrected for, the shape and perhaps other characteristics of the seabed seismic sensor may be selected so that the non-linear motion of the seabed seismic sensor about an axis substantially parallel to the longitudinal axis of symmetry of the seabed cable may not be limited, in contrast to previous designs. Rather, the non-linear motion of the seabed seismic sensor about an axis substantially parallel to the longitudinal axis of symmetry may be used to advantage and measured by means for sensing non-linear motion in correcting for transfer of the horizontal particle displacement of the sea-bottom to a horizontal movement of the seabed seismic sensor. The presence of the seabed seismic sensor itself will disturb the local motion of the Earth, but this problem may be mitigated by selecting the specific density of the seabed seismic sensor to be equal to or nearly equal to that of the Earth in the vicinity of the seabed seismic sensor. Apparatus of the invention include those wherein the means for sensing non-linear motion is selected from one or more non-linear motion sensors, one or more linear motion sensors in conjunction with three linear motion sensors adapted to sense direction of the seismic wave front, and one or more sensors capable of sensing both non-linear and linear motion. The means for sensing non-linear motion may be selected from sensors capable of measuring acceleration in one degree of non-linear motion freedom and sensors capable of measuring accelerations in two or more degrees of non-linear motion freedom. The means for sensing non-linear motion may include a linear motion sensor, which may be selected from sensors capable of measuring acceleration in one degree of linear freedom and sensors capable of measuring accelerations in two or more degrees of linear freedom. Apparatus of the invention include those wherein the means for sensing non-linear motion about at least one axis comprises one or more micro-machined-electro-mechanical sensors, and those wherein the means for sensing non-linear motion comprises a three-component linear motion micro-machined-electro-mechanical sensor. The three-component linear motion micro-machined-electro-mechanical sensor may be positioned in a center of a housing of the seabed seismic sensor.

A second aspect of the invention are methods comprising:
(a) acquiring seismic data using a seabed seismic sensor on a seabed;
(b) sensing non-linear motion of the seabed seismic sensor; and
(c) correcting the seismic data for the non-linear motion of the seabed seismic sensor.

Methods of the invention include those wherein horizontal motion of the Earth, sea currents, and other substantially horizontal forces are converted into non-linear motion of the seabed seismic sensor, thereby distorting the horizontal motion at the seabed seismic sensor location with respect to the motion at the Earth-to-sensor-contact.

In addition to measuring seabed seismic sensor non-linear motion, seabed seismic sensor non-linear motion may be modeled under the expected environmental and seabed conditions and data stored in a usable fashion, such as in a database or data warehouse until needed, along with measured data from previous surveys. Either modeled or previous survey non-linear motion records or both may be used for quality control purposes, as well as for correcting the multi-component measurements. The correction of multi-component measurements may be more complex in some environments, for example when a cylindrical sensor housing (or a portion thereof) is not resting on a flat sea floor. In these environments, certain embodiments of the invention may perform a correction based on modeling or based on laboratory measurements of seabed seismic sensor response to non-linear motion.

In certain embodiments of the invention the DC component of gravity may be measured and used for decomposition of signals from fixed axis seabed seismic sensors into vertical and horizontal components. This may be performed by using MEMS accelerometers measuring the DC component, or by a combination of geophones and inclinometers. One benefit of these methods is that they will allow for a more accurate compensation of the non-linear movement. Without the accurate knowledge of orientation of the seabed seismic sensor (for example in embodiments wherein gimbaled geophones are used if the sensor unit rotates, or fixed geophones without inclinometers), there would be an uncertainty in the direction along which the seismic signal is recorded, which will be detrimental to the data quality in itself, and which in addition could lead to an erroneous non-linear motion movement compensation.

Apparatus and methods of the invention will become more apparent upon review of the brief description of the drawings, the detailed description of the invention, and the claims that follow.

BRIEF DESCRIPTION OF THE DRAWINGS

The manner in which the objectives of the invention and other desirable characteristics can be obtained is explained in the following description and attached drawings in which.

Figure 1:
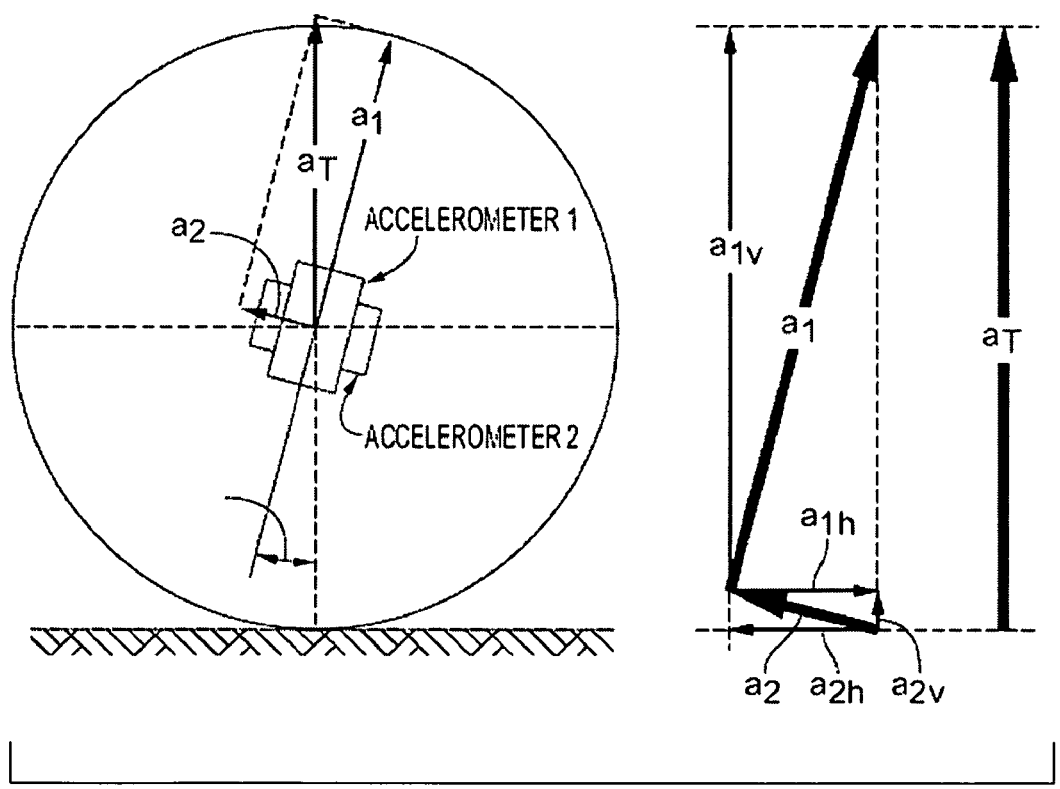
FIG. 1 is a schematic cross-section of a seabed seismic sensor, illustrating decomposition and composition of linear accelerometer signals in accordance with known techniques.

It is to be noted, however, that the appended drawings are not to scale and illustrate only typical embodiments of this invention, and are therefore not to be considered limiting of its scope, for the invention may admit to other equally effective embodiments.

DETAILED DESCRIPTION

In the following description, numerous details are set forth to provide an understanding of the present invention. However, it will be understood by those skilled in the art that the present invention may be practiced without these details and that numerous variations or modifications from the described embodiments may be possible.

All phrases, derivations, collocations and multiword expressions used herein, in particular in the claims that follow, are expressly not limited to nouns and verbs. It is apparent that meanings are not just expressed by nouns and verbs or single words. Languages use a variety of ways to express content. The existence of inventive concepts and the ways in which these are expressed varies in language-cultures. For example, many lexicalized compounds in Germanic languages are often expressed as adjective-noun combinations, noun-preposition-noun combinations or derivations in Romanic languages. The possibility to include phrases, derivations and collocations in the claims is essential for high-quality patents, making it possible to reduce expressions to their conceptual content, and all possible conceptual combinations of words that are compatible with such content (either within a language or across languages) are intended to be included in the used phrases.

The invention describes seabed seismic sensors and methods of using same to reduce the effects of non-linear (rotational, rolling, and/or pivoting) motions of the sensors on the seismic data. The invention also describes modeling one or more of these seabed seismic sensor movements based on historical and/or real-time data records, which may be useful both when the sensors lie on relatively flat sea floors and non-flat sea floors. Such records may be used for quality control purposes, as well as for correcting the multi-component seismic measurements. While the terms "seabed" and "seafloor" are used herein, it will be understood by those of ordinary skill in the art that the invention is not limited to use of seismic cables and sensors on a seabed or seafloor, but the apparatus and methods may be used in all types of water and liquids and all types of terra firma permanently or temporarily under water or other liquid (such as water/oil mixtures, emulsions, chemicals, and the like), including but not limited to fresh water, oceans, seas, transition zones, tidal zones, lagoons, lakes, rivers, bays, gulfs, channels, inlets, fjords, lochs, streams, marshes, creeks, indeed anywhere seismic data is desired.

We can distinguish between two categories of sources of seabed seismic sensor non-linear motion: those sources unrelated to the seismic waves being measured, such as water flow currents; and those related to the seismic waves being measured. In strong water flow current situations, the strongest force applied to the cable may be the lift force because of non-laminar water flow behind the cable. The non-laminar water flow over a cable lying on a seabed may cause both a force caused by disturbed flow trying to push the cable out of position, and a force (Bernoulli lifting force) trying to lift the cable and seabed seismic sensors from the seafloor. The disturbed flow near the bottom of the cable near the impact zone with the oncoming current may cause vibration and/or rotation of the cable and/or seabed seismic sensors, which is undesirable since it creates noise in signals picked up by linear motion seismic sensing units. Furthermore, frequently, but not always, the water flow current increases further away from the seafloor, so that upon initial lifting, the cable and seabed seismic sensors may experience an even greater lift force due to the even stronger water flow current, and any increase in cable height above the seafloor may significantly worsen stability. As should now be clear, the seabed cable and seabed seismic sensors are frequently subject to instability in the presence of strong water currents at or just above the seafloor. Tidal currents, river currents, strong underwater streams, and bad weather (waves) are but a few examples. Water currents induce vibrations that may be transmitted to the seabed seismic sensors. When using previously known box-like seabed seismic sensors, the noise level sensed by the linear motion seismic sensor units may increase, which may degrade data quality and may actually stop data acquisition. Furthermore, the coupling of the box-like seabed seismic sensor housing to the seafloor may become poor and inconsistent, which may degrade data quality. Also, any significant cable movement may require repositioning of the cable and box-like sensors, losing time and may require picking up and re-deploying the cable.

An emerging seismic wave front will have a wave length much longer than the seabed seismic sensor and the linear motion seismic sensing units, and should result in a pure translation movement of the seabed seismic sensor, and therefore the linear motion seismic sensor units contained therein.

However, as the coupling of the seabed seismic sensor to the seafloor is not perfect, it is well known that emerging seismic wave fronts may cause non-linear (rotation, rolling or pivoting) and lateral displacement of the seabed seismic sensor, and thus the linear motion seismic sensing units.

The invention provides apparatus and methods to improve the quality of data collected by seabed seismic sensors in the presence of forces that may result in non-linear motion of seabed seismic sensors, such as water flow currents at or near the seafloor and emerging seismic wave fronts, without significantly increasing their weight. FIG. 1 illustrates a known apparatus and method for decomposing individual linear motion seismic sensor unit signals into horizontal and vertical components using two linear motion sensing elements, for example two perpendicularly positioned accelerometers 1 and 2 that are in a radial plane of a seismic sensor 3, laying on the seabed 4. Linear motion seismic sensors 1 and 2, along with information about the static horizontal and vertical components of the local gravity vector, are capable of decomposing the individual accelerometer signals into a horizontal and a vertical component using a derived angle and summing the contributions from the two linear motion seismic sensors, as further explained herein. Rather than using two MEMS sensors which measure acceleration down to the DC component, use may be made of a combination of seismic sensors not measuring DC component (such as a moving coil geophone or a geophone accelerometer) and associated inclinometers (which measures the DC component of acceleration. In any embodiment, the mechanical properties of the cable and the linear motion seismic sensors are not changed significantly in a way that could impact the quality of the data recorded.

Referring again to FIG. 1, on Earth the only static acceleration is caused by gravity, and because gravity is always directed towards the center of the earth, the orientation of the linear motion seismic sensor units with respect to the vertical can be determined. Assuming that static acceleration due to gravity is g, then the orientation angle φ can be found through the equation:

$$\phi = a\tan(g_{2s}/g_{1s}). \tag{1}$$

wherein:

$g_{2s}$ and $g_{1s}$ are the static components of gravity as measured by sensors 1 and 2, respectively.

With this information and with two perpendicular linear motion seismic sensor units (accelerometers 1 and 2) in the radial plane of the seabed seismic sensor, the dynamic vertical and horizontal accelerations can be measured. Although accelerometers are used for example here, any type of linear motion sensor may be used, or combinations of linear motion sensors. More specifically, the dynamic vertical and horizontal accelerations may be computed by decomposing the individual accelerometer signals into a horizontal and a vertical component using equation (1) and then summing the contributions from sensors 1 and 2. As depicted schematically in FIG. 1, accelerometer 1 measures a signal $a_1$ which is the fraction $a_T \cos(\phi)$ of the true vertical acceleration $a_T$, while accelerometer 2 measures acceleration $a_2$ which is the fraction $a_T \sin(\phi)$ of the true acceleration $a_T$. Decomposition of the measured signals $a_1$ and $a_2$ into vertical components yields $a_{v1} = a_1 \cos(\phi)$ and $a_{2v} = a_2 \cos(\phi)$. Substitution of $a_1$ and $a_2$ and summing both vertical components yields equation (2):

$$A_{Vsum} = a_T \cos(\phi)\cos(\phi) + a_T \sin(\phi)\cos(\phi) = a_T. \tag{2}$$

Indeed, the sum in equation (2) equals the true vertical motion, $a_T$. Similarly, the true horizontal motion can be composed from the individual horizontal sensor motions to yield equation (3):

$$A_{Hsum} = a_H \cos(\phi)\cos(\phi) + a_H \sin(\phi)\cos(\phi) = a_H. \tag{3}$$

As may be appreciated from FIG. 1, if an accelerometer (or other linear motion sensor) were positioned away from the center of the sensor assembly, this would cause an undesired seismic sensor signal as a result of a dynamic non-linear motion. Such rotation-caused "seismic" signals may be calculated and compensated for if the exact geometry of the seabed seismic sensor is known. It is simpler to avoid this complication by positioning the linear motion seismic sensor units in the center of the seabed seismic sensor assembly, which may include a cylindrical housing or the cable per se.

A third motion seismic sensor, which may or may not be an accelerometer, may be oriented in the remaining orthogonal direction, which is the axial direction of the seabed seismic sensor housing, or cable per se. This third linear motion seismic sensor may be used for measuring the orthogonal (in-line) shear wave component.

In addition to the three-component linear motion seismic signal detection, apparatus and methods of the invention may deploy an angular acceleration detector, which may be an angular accelerometer. The angular accelerometer may be a micro-electro-mechanical (MEMS) type accelerometer. An example of such an accelerometer is detailed in the publication of a sensor known under the trade designation LIS1R02 (L6671), available from ST Microelectronics. The specifics of the sensor are explained in ST Microelectronics Application Note 1515, "A Digital Output Angular Accelerometer", F. Pasolini, February 2002, accessible on the date of filing this application on the Internet at http://us.st.com/stonline/books/pdf/docs/8556.pdf. As explained in the introduction of the Application Note, the rotational accelerometer known under the trade designation LIS1R02 is a complete rotational accelerometer system based on a capacitive sensor that uses MEMS technology, and a set of accompanying electronics that produces a digital output. The device may be interfaced to external hardware using a standard 3-wire serial interface that allows internal registers to be written and rotational acceleration samples to be read. The MEMS structure may comprise a rotor and stator assembly in which capacitive variations occur when the relative position of the rotor with respect to the stator changes. These capacitive variations are on the order of $50 \times 10^{-18}$ farads. The MEMS structure also may include actuation electrodes that allow the rotor position to be driven externally by the processing electronics. The electronic processing circuitry processes the capacitive variations that occur between the MEMS rotor and stator. A "sigma-delta" architecture may be implemented that works to continually restore the rotor to nominal position. The control effort, or the signal that drives the rotor to nominal, represents the rotational acceleration that is present at the system location. This control effort is a binary bit stream that is decimated by the electronics to provide a noise-reduced output. Gain and offset adjustments are applied to the decimated bit stream to produce the acceleration samples. Accelerometer samples then are clocked into a four-deep data FIFO within the IC. The decimation and FIFO stages are clocked in a free-running manner based on the selection of either an internal or external clock source.

The angular accelerometer may be used to measure non-linear motion of the seabed seismic sensor or seismic cable about any axis, which may be converted into a measure of horizontal displacement at the circumference of the seabed seismic sensor. In general, an emerging wave front will cause both non-linear and lateral displacement of the seabed seismic sensor and/or seismic cable housing the linear motion seismic sensing units. The axial component may be measured using the axial (orthogonal) sensor only, since the non-linear motion is restricted in most cases, although it is possible to measure and compensate for this also, as explained herein. The lateral component may be calculated by adding the lateral acceleration $a_{Hsum}$ (computed by composition as detailed previously in equation (3)) to the product of the angular acceleration and the radius of the seabed seismic sensor. Finally, the vertical component $a_{Vsum}$ may be obtained also by the composition as detailed previously (equation (2)).

In some embodiments of the invention, non-linear motion may be measured without using a non-linear motion sensor, but using an extra linear motion sensor (accelerometer or other linear motion seismic sensing unit). As described previously, if an accelerometer (or other linear motion seismic sensing unit) was positioned away from the center of the seabed seismic sensor assembly, this may cause an undesired seismic sensor signal as a result of a dynamic rotation. This may be used to calculate the rotation: if a third accelerometer or other linear motion sensor is positioned away from the axis of the seabed seismic sensor parallel to the seabed cable longitudinal axis, we would be able to predict its translation movement by decomposing the measured signal of the first two accelerometers along the axis of the third one. Assuming that the sensors are correctly calibrated, the difference between the predicted and the measured signal corresponds to the acceleration corresponding to the rotation of the cable/seabed seismic sensor about its axis, from which we can calculate the rotational acceleration/motion. This concept may be broadened to the 3D case and to rotations along any axis by having 4 or more accelerometers/linear motion seismic sensing units.

Figure 2:
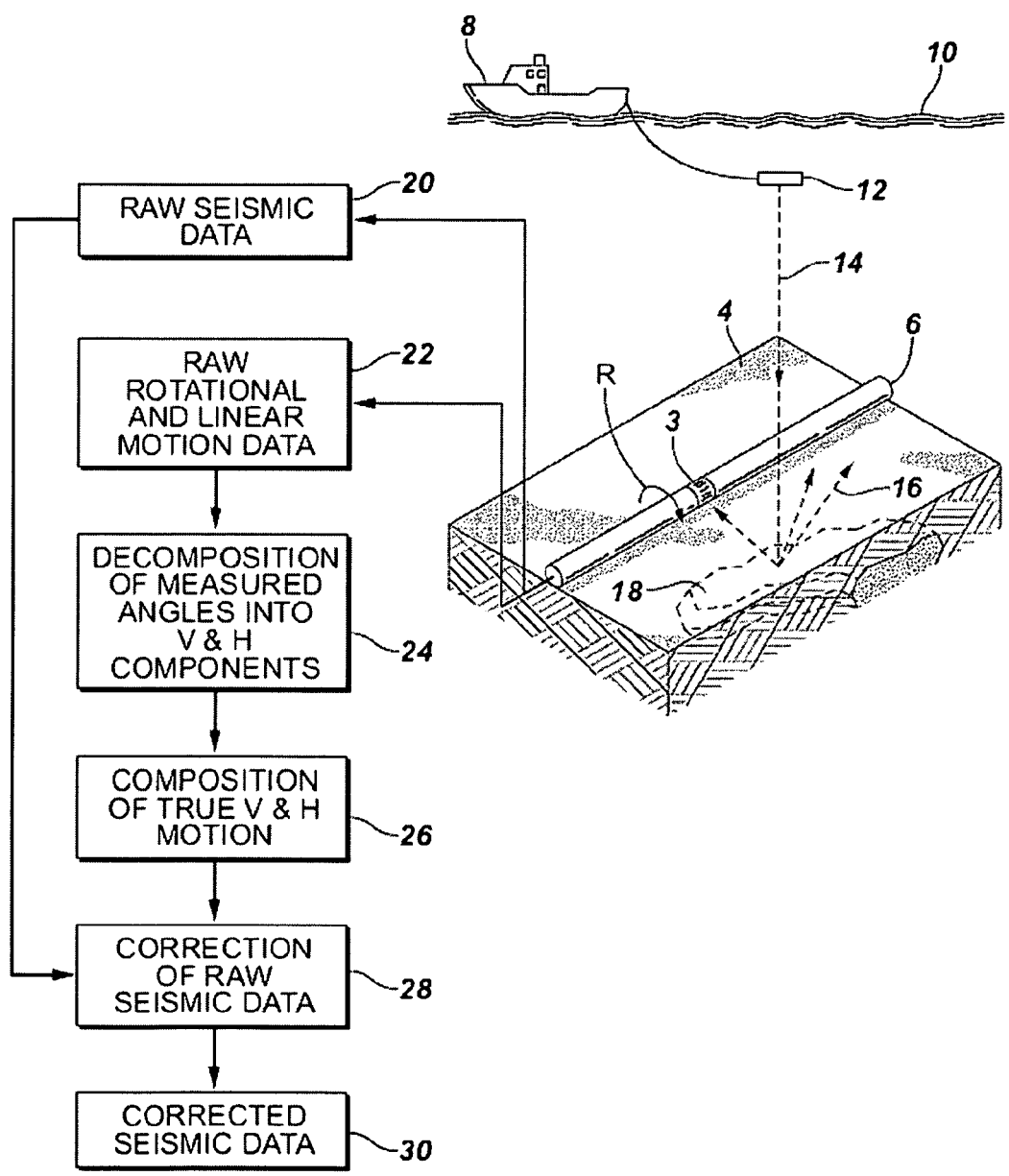
FIG. 2 illustrates one scheme in accordance with the invention for using the data obtained from an apparatus and method of the invention to correct seabed seismic data for non-linear motion.

FIG. 2 illustrates one scheme in accordance with the invention for using the data obtained from an apparatus and method of the invention to correct seabed seismic data. A vessel 8 in ocean 10 tows one or more seismic sources, 12. A cable 6 lays on seabed 4. Cable 6 may rotate as illustrated by curved arrow R. When cable 6 rotates, pivots, and/or rolls, one or more linear motion seismic sensing units 3 (only 1 is illustrated) also rotates, pivots, or rolls. Note that it is not possible to distinguish between a lateral movement and a seismic signal. Source 12 transmits periodic acoustic pulses 14, which ideally are reflected 16 off of a subterranean hydrocarbon deposit 18. Some of the reflected signals are received at linear motion seismic sensing units 3. Raw seismic data 20 is collected, as well as raw non-linear and linear motion data 22. Decomposing measured signals into vertical and horizontal components is then performed, represented at box 24, followed by composing into true vertical and horizontal motion at 26. Raw seismic data may then be corrected, either in real time, or at another time, as represented at 28, to form corrected seismic data 30. Other optional correction subroutines (not shown) may be integrated with the scheme depicted in FIG. 2, and those of ordinary skill in the art of marine seismic hydrocarbon exploration will understand that there are many existing and foreseeable equivalents to the scheme depicted in FIG. 2.

FIGS. 1 and 2 deal with non-linear motion of a seabed seismic sensor or cable under circumstances when the seabed is relatively flat. The invention in relation to FIGS. 1 and 2 addresses the problem of distorted transfer from a horizontal earth motion into a proportional horizontal sensor motion, as well as the undesired cross-feed from horizontal into vertical motion. These distortions may arise from one or more static or dynamic non-linear motions of the seabed seismic sensor. In the case of dynamic rotation, some of the horizontal energy from the earth is transferred to rotational energy of the seabed seismic sensor. We described how one can remove this distortion from the horizontal component by measuring the rotation and adding the product of the angular acceleration and the radius (or effective radius, for non-cylindrical housings) of the seabed seismic sensor housing to the horizontal measurement. We also described in relation to FIGS. 1 and 2 how a dynamic rotation of the sensor housing may lead to cross-feed to the vertical component if the sensor housing is not cylindrical or if the linear motion seismic sensing units are not placed in the geometric middle of the seabed seismic sensor housing.

Figure 3:
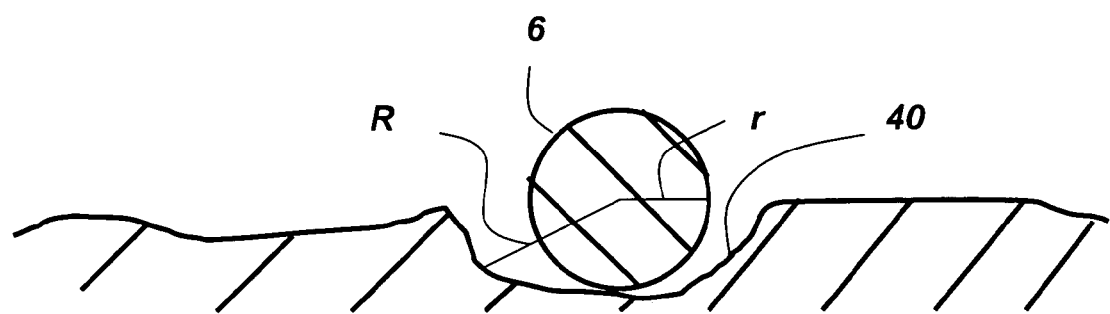
FIG. 3 illustrates a cross section of a cylindrical seabed seismic sensor positioned in a non-flat portion of a sea floor.

While FIGS. 1 and 2 deal with rotation of a seabed seismic sensor or cable under circumstances when the seabed is relatively flat, of course, this is not always true. Two additional sources of distortion and cross-feed that have not been mentioned so far are if the sea floor is not flat around the seabed seismic sensor, which is quite likely in real life, or if the seabed seismic sensor gives some unwanted response to one or more dynamic non-linear motions, for instance due to the fact that the sensor is not a true point receiver but has a finite extension. The present invention also addresses these two additional sources of distortion to the horizontal and vertical components. FIG. 3 illustrates one simplified situation, illustrating a cross section of a cable or seabed seismic sensor 6 lying in a half-cylindrical cavity 40. This example assumes cylindrical cable and/or seabed seismic sensor, but the invention is not so limited. Cable or seabed seismic sensor 6 has a radius of r, while the half-cylindrical cavity 40 has a radius of R in this simplified representation. One approach is to model the sensor response due to one or more non-linear motions on a non-flat sea floor. Another solution is to measure, under laboratory conditions, sensor response due to one or more non-linear motions, and use these measurements actively in data correction schemes.

One possible model of the situation is a "ball in a bowl", as illustrated in FIG. 3. The idea is that a seabed seismic sensor housing having a radius (or effective radius) of r is free to roll back and forth within the "bowl", representing a locally curved sea floor 40 having radius R. This model incorporates both a flat and a locally curved sea floor, depending on the choice of the radius R of the "bowl." Assuming that the earth motion is known one may compute how the seabed seismic sensor housing moves, and hence what the linear motion seismic sensing units will record. This model may also be used for inverse modeling, i.e. to find the true response of the earth given the linear seismic sensing unit response. The radius R, as well as drag and friction coefficients, are generally unknown in this model. Such parameters will exist in all models and may for instance be determined by tuning the model to measured data. It is likely that these parameters will change with area and seabed conditions, hence one will most likely need some measurements for any new survey, but not necessarily for every seabed seismic sensor. Another reason for using modeled instead of measured rotations is that the rotation measurement itself may be noisy. Fitting a modeled rotation record to the measured one using a local or remote calculation unit may provide a reduced noise or noise-free rotation record and may reduce or eliminate unwanted noise in seismic data through the rotation correction scheme.

In addition to the possibility of correcting the sensor responses based on one or more non-linear motion measurements, and modeling, one may use the non-linear motion measurements for quality control purposes, either with or without correcting the sensor responses. Reasons for doing this may be that the correction scheme is too computationally expensive or that the non-linear motion measurement is noisy as mentioned above, hence the correction scheme may introduce unwanted noise.

In the embodiments of FIGS. 1-3 the non-linear motion is assumed to be only in the plane perpendicular to the longitudinal axis of the cable. Although non-linear motion is most likely in this plane, non-linear motion, for example may occur about any axis. Providing we characterize the seabed seismic sensor non-linear motion around any axis (as by having a three-axis of symmetry rotation sensor), the methods described above may be extended to three dimensions, and may be used to compensate for rotations of the seabed seismic sensors around any one or more axis.

It should be noted that in the embodiments discussed in reference to FIGS. 1, 2 and 3, and indeed all embodiments and figures of the present invention, geophones are not depicted, but would typically be spaced along and/or inside each seabed cable. If desired, to reduce some of the non-linear and lateral movements of the seabed seismic sensors and cables, cleats may be used, although the number of cleats may be less in the practice of the present invention, as non-linear and lateral movement is not necessarily disadvantageous.

In sum, apparatus and methods of the invention may use one or more non-linear motion sensors to measure one or more non-linear motions about any axis, or non-linear motion about any axis of the seabed seismic sensor may also be derived from the linear motion seismic sensing unit (geophones and/or accelerometers) measurements if more than three are used. The translation motion will in all embodiments be fully characterized by three linear motion seismic sensing units such as geophones and accelerometers. If only a translation motion is measured, a fourth linear motion seismic sensing unit, located somewhere else in the seabed seismic sensor housing, would record exactly the same signal than may be obtained by rotation data from the first three linear motion sensing units in the direction of the fourth. If there is a difference, assuming that the linear motion sensing units are well calibrated, it is coming from some type of non-linear motion.

Other than the inventive features discussed herein, seabed seismic sensors and their support cables useful in the invention include those described in the article "Shear Waves Shine Brightly", Oilfield Review, pages 2-15 (1999), and typically comprise an instrumented cable packed with seismic receivers and additional motion sensors, similar to the streamers that are towed in conventional marine surveys, but designed to operate on the seafloor. One useful seabed seismic cable for use in the present invention, known under the trade designation "NESSIE 4C", contains multiple linear motion seismic sensing units each containing one hydrophone and three orthogonally oriented geophones inside the cable, distributing their weight for optimal coupling to the seafloor. These cables may be modified in accordance with the invention to include one or more non-linear motion sensors described herein, or additional linear motion sensors. Each cable may house hundreds of four-component seismic sensors, and multiple motion sensors. Full particle-motion vector recording of all P (pressure) and S (shear) wave fronts may be achieved, along with the pressure wave front familiar from towed streamers. This design was an improvement over conventional ocean bottom cables, which may be employed in the present invention as well, comprising only a hydrophone and a vertically oriented geophone strapped to the outside, and including motion sensors as described herein; however, this arrangement is incapable of recording the full particle-motion vector. The motion sensors would, however, compensate for any non-optimal coupling of this type of cable to the seafloor.

Another seabed cable useful in the invention is described (except for the inventive concepts described herein) in U.S. Pat. No. 6,021,091, also assigned to WesternGeco, which describes an elongated ocean-bottom seismic cable section of a desired length manufactured by assembling a stress member in combination with a plurality of signal communication channels. A plurality of receiver clusters is fastened to the assembly at desired intervals. Each cluster includes at least two multi-axial, gimbal-supported seismic receivers that are symmetrically mounted about the axis of the cable assembly. Output signals from the common axes of the respective multi-axis receivers of each cluster are coupled with each other through a suitable filter and linked to corresponding signal communication channels. The cable section is terminated by connectors for providing mechanical and communication linkage to other sections and eventually to signal-processing instrumentation.

The motion sensing elements (linear and non-linear) may be included with the cable during the manufacture of the cable, or added afterwards. Methods of making motions sensors, for example MEMS sensors, are not the subject of the invention, these methods being known from publications such as U.S. Pat. Nos. 4,932,261; 5,831,164; and 6,257,062. These patents discuss the benefits of motion sensors, but do not suggest the apparatus and methods of the present invention. For example, the 261 patent discloses a spring-mass-support structure arranged as an accelerometer with two electrostatic feedback loops so as to measure two components of acceleration. Two of such accelerometers are advantageously used on a submerged platform to determine the direction of a sound source in a body of water. One of such feedback loops of each accelerometer is used to measure low frequency gravitational acceleration applied to the platform as a result of the tilt of the platform due to the action of current and wave action of the water. The other of the feedback loops of each accelerometer measures sound wave induced acceleration on the platform. The gravitational acceleration of each accelerometer is used to compensate the higher frequency acceleration for the effect of tilt of the platform. The 164 patent discloses a two degree of freedom (2 DOF) accelerometer comprising two imbalanced sensing modules (i.e., bar modules having an unbalance) such that two sensing modules are located in the plane to be measured. The two imbalanced sensing modules have force balance and are used to measure linear and angular accelerations in two degrees of freedom. A single modular design is used for both of the axes. Each of the two individual sensing modules has a housing containing a proof mass for each measured output and a support of the proof mass with the support optimized for the sensitive axis selected for sensor output and having high rigidity in all other axes of the support. Also provided is electrostatic servo force balance technology. A proportional-integral-derivative (PID) controller is used to obtain a closed loop bandwidth of 1 kHz and a steady state error of zero for full-scale accelerations up to 75 g's and 1000 rad/sec$^2$. The 062 patent discloses an angular accelerometer having a substrate, a plurality of fixed electrodes supported on the substrate and each including fixed capacitive plates, and a rotational inertia mass including a plurality of movable capacitive plates arranged to provide a capacitive coupling with the fixed capacitive plates. The rotational inertia mass is rotationally movable relative to the fixed electrodes in response to angular acceleration. The angular accelerometer further includes support members for supporting the rotational inertia mass and biasing the rotational inertia mass relative to the fixed electrodes during rotational movement of the rotational inertia mass. An input is coupled to the plurality of fixed capacitive plates for receiving an input signal, and an output is coupled to the other of the plurality of fixed and movable capacitive plates for providing an output signal that varies as a function of the capacitive coupling between the fixed and movable capacitive plates and is indicative of angular acceleration Desired properties of seabed cables useful in the invention, other than buoyancy properties, are similar to those typically specified for towed streamers, such as streamers described in various patents. The cable may be water tight, armored, and carry sufficient number of wires or optical fibers to carry acoustic data from the sensors in the cable to a data collection unit. Methods of making cables having protruding cleats are also known. The cables of the invention may have a minimum working strength of 4000 pounds and minimum breaking strength of 8000 pounds, and may have separate electrical (or fiber optic) and mechanical terminations to provide strain relief for electrical (or fiber optic) connectors and to enable the electrical or optical connectors to be connected and disconnected while maintaining a working strength tension.

The cable outer skin may be made of any natural or synthetic material. Useful synthetic materials include thermoplastic elastomers, such as polyurethane thermoplastic elastomers, polyester thermoplastic elastomers, and ionomeric thermoplastic elastomers. The synthetic materials may have additives therein which reduce or prevent fouling of these elements. Thermoplastic elastomers are defined and reviewed in Thermoplastic Elastomers, A Comprehensive Review, edited by N. R. Legge, G. Holden and H. E. Schroeder, Hanser Publishers, New York, 1987. Thermoplastic elastomers, upon heating above the melting temperature of the hard regions, form a homogeneous melt which can be processed by thermoplastic techniques (unlike elastomers), such as injection molding, extrusion, blow molding, and the like. Subsequent cooling leads again to segregation of hard and soft regions resulting in a material having elastomeric properties, however, which does not occur with thermoplastics. Some commercially available thermoplastic elastomers include segmented polyester thermoplastic elastomers, segmented polyurethane thermoplastic elastomers, segmented polyurethane thermoplastic elastomers blended with other thermoplastic materials, segmented polyamide thermoplastic elastomers, and ionomeric thermoplastic elastomers.

Apparatus and methods of the invention may also have advantages in protecting the cable against abrasion and cuts in case of dragging on the seafloor, particularly when thermoplastic elastomers are used for cable outer skin. Rather than moving in a cross-line direction, the cable may be allowed to rotate slightly.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, no clauses are intended to be in the means-plus-function format allowed by 35 U.S.C. §112, paragraph 6 unless "means for" is explicitly recited together with an associated function. "Means for" clauses are intended to cover the structures described herein as performing the recited function and not only structural equivalents, but also equivalent structures.

What is claimed is:

1. An apparatus comprising:
    a plurality of seismic sensors spaced along a line, each sensor comprising:
        a first linear motion sensing unit positioned at a center of the sensor;
        a second linear motion sensing unit positioned in a first orthogonal position with respect to the first linear motion sensing unit at the center of the sensor;
        a third linear motion sensing unit positioned in a second orthogonal position with respect to the first linear motion sensing unit and the second linear motion sensing unit at the center of the sensor; and
        a fourth linear motion sensing unit positioned away from the center of the sensor, wherein the first linear motion sensing unit, the second linear motion sensing unit, the third linear motion sensing unit, and the fourth linear motion sensing unit are configured to determine a rotational motion of the sensor.

2. The apparatus of claim 1, further comprising:
    a calculation unit configured to determine the rotational motion of the sensor by:
        predicting a translation movement of the fourth linear motion sensing unit; and
        determining a difference between the predicted translation movement of the fourth linear motion sensing unit and a measured signal of the fourth linear motion sensing unit.

3. The apparatus of claim 2, wherein the translation movement is predicted by decomposing a measured signal of the first linear motion sensing unit, a measured signal of the second linear motion sensing unit, and a measured signal of the third linear motion sensing unit along an axis of the fourth linear motion sensing unit.

4. An apparatus comprising:
    a plurality of seismic sensors spaced along a line, each sensor comprising:
        a first linear motion sensing unit positioned at a center of the sensor;
        a second linear motion sensing unit positioned perpendicularly to the first linear motion sensing unit at the center of the sensor;
        a third linear motion sensing unit positioned away from the center of the sensor; and
        a calculation unit configured to determine the rotational motion of the sensor by:
            predicting a translation movement of the third linear motion sensing unit; and
            determining a difference between the predicted translation movement of the third linear motion sensing unit and a measured signal of the third linear motion sensing unit.

5. The apparatus of claim 4, wherein the translation movement is predicted by decomposing a measured signal of the first linear motion sensing unit and a measured signal of the second linear motion sensing unit along an axis of the third linear motion sensing unit.

6. The apparatus of claim 1, wherein the plurality of seismic sensors are disposed on land.

7. The apparatus of claim 1, wherein the plurality of seismic sensors are disposed under water.

8. The apparatus of claim 4, wherein the plurality of seismic sensors are disposed on land.

9. The apparatus of claim 4, wherein the plurality of seismic sensors are disposed under water.